United States Patent [19]

Teot et al.

[11] E Re. 30,472

[45] Reissued Jan. 6, 1981

[54] DETERGENT COMPOSITION WITH ANTISOIL AND ANTIREDEPOSITION PROPERTIES

[75] Inventors: Arthur S. Teot; Percy J. Hamlin; Albert B. Savage, all of Midland, Mich.

[73] Assignee: The Dow Chemical Company, Midland, Mich.

[21] Appl. No.: 68,293

[22] Filed: Aug. 20, 1979

Related U.S. Patent Documents

Reissue of:

[64] Patent No.: 4,138,352
Issued: Feb. 6, 1979
Appl. No.: 878,122
Filed: Feb. 3, 1978

U.S. Applications:

[63] Continuation of Ser. No. 775,136, Mar. 7, 1977, abandoned, which is a continuation-in-part of Ser. No. 679,536, Apr. 23, 1976, abandoned.

[51] Int. Cl.[3] ..... C08B 11/193; C11D 3/37; D06M 15/04; D06M 15/24

[52] U.S. Cl. ..... 252/135; 252/132; 252/174.21; 252/174.23; 252/DIG. 2; 252/DIG. 15; 536/91; 427/393.4

[58] Field of Search ..... 252/99, 132, 135, DIG. 1, 252/DIG. 2, DIG. 5, 174.21, 174.23; 536/91; 427/390 E

[56] References Cited

U.S. PATENT DOCUMENTS

| | | | |
|---|---|---|---|
| 3,590,001 | 6/1971 | Taylor | 252/135 X |
| 3,749,675 | 7/1973 | Chang | 252/135 |
| 3,843,563 | 10/1974 | Davies | 252/547 |
| 3,865,754 | 2/1975 | Norris | 252/532 |
| 3,925,228 | 12/1975 | Cheng | 252/110 |
| 3,957,695 | 5/1976 | Davies | 252/532 |
| 4,000,093 | 12/1976 | Nicol et al. | 252/529 |

FOREIGN PATENT DOCUMENTS

| | | | |
|---|---|---|---|
| 2613790 | 10/1976 | Fed. Rep. of Germany | 252/174.23 |
| 2103929 | 4/1972 | France | 252/174.23 |
| 7701022 | 8/1977 | Netherlands | 252/174.23 |
| 727174 | 10/1972 | South Africa | 252/174.23 |
| 735423 | 8/1973 | South Africa | 252/174.23 |
| 1314897 | 4/1973 | United Kingdom | 252/174.23 |

*Primary Examiner*—Dennis L. Albrecht

[57] ABSTRACT

Detergent compositions of particular value in washing synthetic fabrics, especially polyester, inhibiting the redeposition of soil and imparting antisoil properties are based essentially on a combination of a nonionic surfactant and a hydroxybutylated methylcellulose of low molecular weight and having a relatively high degree of substitution.

4 Claims, No Drawings

DETERGENT COMPOSITION WITH ANTISOIL AND ANTIREDEPOSITION PROPERTIES

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation of Ser. No. 775,136 filed Mar. 7, 1977, now abandoned, which in turn is a continuation-in-part of our previous application Ser. No. 679,536 filed Apr. 23, 1976 now abandoned.

BACKGROUND OF THE INVENTION

It is known to use cellulosic polymers such as carboxymethylcellulose in detergent formulations to inhibit redeposition of soil on the fabrics being washed. Combinations of carboxymethylcellulose and a methylhydroxyalkylcellulose have been used for the purpose in conventional phosphate-detergent compositions such as those described in U.S. Pat. Nos. 2,886,533 and 3,523,088, also in German Offen. Nos. 2,138,731 and 2,340,161. U.S. Pat. No. 3,928,213 discloses a fabric softener composition that includes an alkylcellulose or hydroxyalkyl alkyl cellulose and a nonionic surfactant.

Carboxymethylcellulose, while an effective redeposition inhibitor for cotton fabrics, is less effective with synthetic fabrics, particularly polyester. Also, in recent years the use of phosphate builders such as sodium tripolyphosphate in detergent formulations has been minimized or avoided in order to reduce the concentrations of phosphate in waste water. A common replacement for the phosphate component in detergent formulations has been sodium carbonate or a mixture of sodium carbonate and sodium bicarbonate. Sodium nitrilotriacetate and sodium ethylenediaminetetraacetate have also been used as detergency builders. Generally, the detergency of carbonate formulations is significantly poorer than that of corresponding high phosphate formulations, especially with synthetic fabrics.

SUMMARY OF THE INVENTION

It has now been found that a high order of antisoil activity is produced on synthetic textile fibers, polyester fibers particularly, when these fibers are contacted by the aqueous solution of a combination of a nonionic surfactant with a minor proportion, preferably about 0.2–50 percent and most preferably about 1–20 percent based on the weight of the surfactant of a low molecular weight hydroxybutyl methylcellulose. Preferably, this combination is the essential basis of an otherwise conventional detergent composition which provides, in addition to the antisoil activity, unusually good detergency and excellent antiredeposition effect. The hydroxybutyl methylcellulose component is characterized by having a DS of about 1.5–2.5 methoxyl groups and an MS of about 0.01 to about 0.8 hydroxybutyl groups. The novel composition preferably consists essentially of about 7–70 percent by weight of a nonionic surfactant, preferably of the polyethylene glycol monoether type, up to about 80 percent of a builder, 5–30 percent of sodium silicate having an $SiO_2/Na_2O$ ratio of about 2–3/1, and about 0.05–5 percent of total, all on a dry basis, of the low molecular weight hydroxybutyl methylcellulose component. About 0.3–2 percent of hydroxybutyl methylcellulose component is usually preferred. The basic composition as outlined may also contain as an optional component up to about 40 percent $Na_2SO_4$. This new detergent formulation is particularly advantageous in washing polyester and other synthetic fabrics.

DETAILED DESCRIPTION OF THE INVENTION

The terms DS and MS as applied above to the cellulosic polymer refer to the amounts of substitution on each anhydroglucose unit in the cellulose molecule. DS means degree of substitution of the three hydroxyl groups on each anhydroglucose unit, to form methyl ether groups in the present case, and is an average number. For example, in the hydroxybutyl methylcellulose of this invention, an average of about 1.5–2.5 of the hydroxyl groups per anhydroglucose unit have been etherified to form methoxyl substituents. Best results are usually obtained when DS = 1.8–2.3.

MS means the average moles of reactant, in this case butylene oxide, combined with free hydroxyl groups per anhydroglucose unit. Since the butylene oxide reaction product itself has a reactive hydroxyl group which can react further to form a butylenoxy chain, the value of MS reflects a sum of butylenoxy units present both as single hydroxybutyl and butylenoxyhydroxybutyl substituents for each anhydroglucose moiety. As noted above, MS can range as high as about 0.8 and is preferably 0.01–0.6 [of] *for* this hydroxybutyl methylcellulose. Generally, best results are obtained with a hydroxybutylmethylcellulose wherein the MS value is inversely proportional to the DS value, for example, a high MS and low DS or a low MS and high DS, all within the ranges specified for this invention. For example, a hydroxybutyl methylcellulose having a DS of 1.5 and MS of 0.4 can give good results comparable to those obtained with DS of 2 and MS of 0.01.

The hydroxybutylmethylcellulose useful in this new detergent composition is of relatively low molecular weight. This property is most readily defined by measuring the viscosity of an aqueous solution. Preferred materials are those which show a viscosity of about 10–400 cps in 2 percent aqueous solution at 20° C. and best results are obtained when the viscosity is in the range of 20–200 cps. Hydroxybutyl methylcellulose can be made by conventional means such as described in Savage, U.S. Pat. No. 2,835,666.

A liquid formulation can contain as much as 70 percent nonionic surfactant based on the total active ingredients. Dry formulations preferably contain about 7–30 percent of this component. The nonionic surfactant can be broadly defined as compounds produced by the condensation of ethylene oxide with an active hydrogen or hydroxyl group in an organic hydrophobic compound which can be aliphatic or alkyl substituted aromatic in nature. The length of the hydrophilic polyoxyethylene alcohol radical thereby formed on the hydrophobic and lipophilic nucleus can be readily adjusted to yield a water-soluble compound having the desired hydrophilic-lipophilic balance (HLB). Substantially any such substance which has the required stability under relatively high pH laundry conditions and good detergent properties is useful in the present invention. An HLB value in the approximate range of 12–16 is preferred for best activity as a detergent.

The nonionic surfactant is preferably any one or a mixture of two or more of the commonly available higher alkyl monoethers of polyethylene glycol and the corresponding higher alkylphenyl monoethers. These surfactants are the condensation products of about 5–20 moles of ethylene oxide with a mole of alkanol of about 8–22 carbon atoms or with a mole of alkylphenol wherein the alkyl group is of about 8–18 carbon atoms. Some examples of the commercially available compounds of this type are the products of condensation of octyl alcohol with six moles of ethylene oxide, dodecyl alcohol with thirteen moles of ethylene oxide, dodecyl alcohol with ten moles of ethylene oxide, nonylphenol with ten moles of ethylene oxide, and octylphenol with nine moles of ethylene oxide.

The surfactant can also be the condensation product of a higher alkanoic acid amide of about 8–20 carbon atoms with about 6–20 moles of ethylene oxide, the amount of oxide being roughly proportional to the molecular weight of the acid. Examples of this class include stearamide + 15 EO, lauramide + 12 EO and caprylamide + 10 EO.

Another well-known type of nonionic surfactant useful in this invention is the condensation product of ethylene oxide with polypropylene glycol, for example, the block copolymers sold under the trademark Pluronic®, by Wyandotte Chemicals Corporation. Liquid products of this kind made by condensing up to about an equal weight of ethylene oxide with a polypropylene glycol of 1500–2000 molecular weight have good detergent values.

Detergency builders generally can be used at a concentration of up to about 80 percent of the weight of active ingredients. A liquid formulation may contain no builder component whereas a dry composition can contain about 8–80 percent builder and preferably from about 25 percent to about 60 percent of builder is used, depending on the kind of builder, the type of formulation and its application. Any of the commonly used organic or inorganic builder salts can be used effectively. These are water-soluble salts, usually alkali metal salts, and in practice sodium salts are the standard choice. Among such salts are the phosphates, which term is used to include orthophosphates, pyrophosphates, polyphosphates, and phosphonates. A phosphate builder is preferably used in a proportion of about 15–60 percent of the dry detergent composition, most preferably about 20–40 percent when it is the principal builder present. Other effective builders are amine polyacetates such as ethylenediaminetetraacetate and nitrilotriacetate. These can be used in a proportion of about 8 percent to about 50 percent, preferably about 20–30 percent of the dry composition.

Of particular interest in the present invention are carbonate builders, partially because of limitations put in recent years on the use of phosphates and amine polyacetates, but also because of unexpectedly good detergency found when these builders are used with this nonionic surfactant-cellulose ether combination. A sodium carbonate component can be $Na_2CO_3$ alone or it may be a mixture of $Na_2CO_3$ and $NaHCO_3$ in order to hold the pH of the wash solution below the level provided by $Na_2CO_3$ only. An equimolar mixture of carbonate and bicarbonate (sodium sesquicarbonate) is suitable for most applications. The total quantity of carbonate is adjusted within the defined limits according to the hardness of the local water. Usually about 50–60 percent of carbonate is employed based on the weight of dry formulation unless the water is relatively soft.

Water-soluble silicates are useful auxiliary builders used in combination with any of the above. Sodium silicate as previously defined is a preferred component of the claimed composition, preferably in an amount of about 5–15 percent of the whole.

An optional component of the formulation is sodium sulfate ($Na_2SO_4$) present in a proportion as previously defined. Best results are usually obtained when sodium sulfate is present in a proportion of about 5–15 percent by weight of total formulation on a dry basis or up to about 30 percent when the formulation is to be spray dried. Sodium chloride is an inert impurity often present in minor amount.

A principal advantage of this new detergent composition is its characteristic property of imparting to a synthetic textile fiber or fabric a resistance to soiling when that fiber or fabric is contacted with an aqueous solution of the composition. Only the basic combination of nonionic surfactant with the hydroxybutylated methylcellulose is necessary in the solution to produce the antisoil effect on the contacted textile fibers. The maximum initial antisoil activity is obtained when the textile material is prewashed with either this basic solution or with a solution of the full detergent formulation before use although conventional washing using this composition after soiling also builds up and maintains a high resistance to soiling after repeated washings so that the material stays cleaner between washes.

The new detergent composition is advantageously used on synthetic textiles such as polyesters, polyamides, polyacrylates, and blends thereof. It is particularly useful for washing polyester fabrics.

Compositions within the present invention were prepared and tested according to the following procedure. The results were compared to those obtained by the same procedure using somewhat similar known detergent compositions.

TEST PROCEDURE

The detergency measurement was made in a soil accumulation test in which swatches of fabric (5×5 in.) were subjected to multiple soiling-washing cycles. Antiredeposition was measured on unsoiled swatches of the same fabric put in the wash water during washing. Measurements were by reflectance. The detailed procedure was as follows:

(1) A standard soil slurry was prepared by dispersing 16 g of <270 mesh representative vacuum cleaner household dirt in 3 liters of deionized water.

(2) Eight swatches of fabric were added to 3 liters of the soil slurry and the slurry was shaken on a mechanical shaker for one hour.

(3) The swatches were removed and dipped twice into warm tap water to remove loose soil, excess water was squeezed out, the wet swatches were blotted on clean paper towels and dried in a forced air oven at 55° C.

(4) The dried swatches were immersed in 2 percent artificial sebum (4:1 lanolin-oleic acid) solution in perchloroethylene, excess solution was squeezed out, and the wet swatches were partially air-dried in a hood, then drying was completed in a forced air oven at 55° C.

(5) Swatches soiled as described above and clean swatches of the same material were washed together in a liter of 0.2 percent solution of detergent composition in water (150 ppm hardness) for ten minutes at 48° C. in a Terg-O-Tometer® test washing machine (Model No. 7243, U.S. Testing Co.).

(6) The washed swatches were flooded and squeezed out twice with deionized water, then washed in the washing machine for five minutes with a liter of water (150 ppm hardness) at room temperature. The swatches were removed from the rinse water, excess water was squeezed out, and they were dried at about 55° C. in a tumble drier.

(7) Reflectance of the dry swatches was determined using a model D40 Reflectometer ® (Hunter Laboratories).

WASH SOLUTIONS

Solutions containing 0.2 percent by weight of total detergent composition were made up as follows for test and comparison purposes:

| AATCC Standard Phosphate Formulation | |
|---|---|
| 0.028% | linear dodecylbenzenesulfonate, Na salt |
| 0.0046% | higher linear alkyl monoether of polyethylene glycol |
| 0.005% | high molecular weight soap |
| 0.096% | Na tripolyphosphate |
| 0.0194% | Na silicate ($SiO_2/Na_2O$ = 2.0) |
| 0.0308% | $Na_2SO_4$ |
| 0.0005% | sodium carboxymethylcellulose |
| 0.0157% | inerts and moisture |
| | balance 150 ppm hardness water |

| Carbonate-built Formulation | |
|---|---|
| 0.04% | nonionic surfactant |
| 0.053% | $NaHCO_3$ |
| 0.067% | $Na_2CO_3$ |
| 0.02% | Na silicate ($SiO/Na_2O$ = 2.4/1) |
| 0.018% | $Na_2SO_4$ |
| 0.002% | hydroxybutylmethylcellulose (or $Na_2SO_4$ for a blank) |
| | balance 150 ppm hardness water |

EXAMPLES 1-10

Using the standard phosphate formulation and the carbonate formulation listed above with no cellulosic polymer additive and the carbonate formulation containing 0.002 percent of a hydroxybutylmethylcellulose with DS, MS, and viscosity values as shown, swatches of doubleknit Fortrel ® polyester fabric were subjected to three wash cycles for determination of antiredeposition and detergency as previously described. The nonionic surfactant was the condensation product of a $C_{15}$ (average) linear alkanol with about 9 moles of ethylene oxide (Tergitol ® 15-S-9).

TABLE I

| Example No. | Hydroxybutyl Methyl Cellulose DS (MeO) | MS (HB) | Visc* | Reflectance** Antiredep. | Detergency |
|---|---|---|---|---|---|
| 1 | 1.52 | 0.46 | 22 | −0.2(76.9)3.3 | 7.1(52.4)9.5 |
| 2 | 1.59 | 0.18 | 49 | 0.1(78.4)2.8 | 10.0(55.0)12.4 |
| 3 | 1.73 | 0.14 | 34 | 0.1(78.4)3.1 | 10.0(55.0)8.4 |
| 4 | 1.85 | 0.07 | 20 | −1.0(79.9)0.5 | 11.3(54.2)9.4 |
| 5 | 1.88 | 0.09 | 67 | −1.0(77.3)3.0 | 5.1(49.1)12.1 |
| 6 | 1.94 | 0.05 | 22 | −1.0(79.9)0.7 | 11.3(54.2)13.5 |
| 7 | 2.04 | 0.01 | 104 | −1.8(79.0)1.9 | 1.7(51.9)13.0 |
| 8 | 2.04 | 0.01 | 202 | −0.1(77.3)3.5 | 7.4(47.7)18.5 |
| 9 | 2.17 | 0.01 | 106 | −1.8(79.0)1.3 | 1.7(51.9)6.3 |
| 10 | 2.17 | 0.05 | 26 | −1.0(79.9)1.4 | 11.3(54.2)15.6 |

*viscosity in cps of 2% water solution at 20° C.

**The reflectance values are relative to blanks run with the carbonate formulation containing no cellulosic polymer. In each column, the carbonate blank reading is in parenthesis and the figures to the left and right of the blank represent the differences between the blank and the phosphate formulation result and between the blank and the carbonate-cellulosic polymer formulation result respectively. Thus in Example I, the average reflectances of the antiredeposition tests using phosphate, blank carbonate, and carbonate + polymer respectively were 76.7, 76.9, and 80.2.

EXAMPLE 11

According to the procedure of Examples 1-10, swatches of doubleknit Fortrel ® polyester cloth were subjected to three wash cycles using as wash solutions the standard phosphate solution, a blank carbonate solution containing no cellulosic polymer and made up with a lower concentration of the same nonionic surfactant, the carbonate solution with added 0.002 percent sodium carboxymethylcellulose, and the carbonate solution with added 0.002 percent HBMC (1.88 DS methoxyl, 0.09 MS hydroxybutyl, 2 percent viscosity = 67 cps). The blank carbonate solution was as shown above but contained 0.024 percent nonionic surfactant and 0.034 percent $Na_2SO_4$.

Average reflectances (2 replicates of each) of the washed swatches were as follows:

TABLE II

| Wash Solution | Reflectance Antiredeposition | Detergency |
|---|---|---|
| AATC Phosphate | 76.4 | 51.8 |
| Carbonate blank | 76.1 | 42.5 |
| Carbonate + CMC | 75.5 | 40.5 |
| Carbonate + HBMC | 79.6 | 60.0 |

EXAMPLES 12-14

As described in Examples 1-10, swatches of Fortrel ® polyester doubleknit fabric were subjected to three soiling-washing cycles [of] *for* detergency effect using the blank carbonate formulation for one set of swatches and the carbonate formulation containing 0.002 percent of a hydroxybutylmethylcellulose of DS 1.88, MS 0.09, and 2 percent viscosity 67 cps. The reflectances were measured before and after each cycle. The procedure was repeated twice as a check on accuracy. The average reflectances found are listed in Table III.

TABLE III

| Example No. | Stage | Relectance Blank | with HBMC |
|---|---|---|---|
| 12 | cycle 1 | | |
| | clean fabric | 81 | 81 |
| | soiled | 50.9 | 50.5 |
| | washed | 70.5 | 72.2 |

TABLE III-continued

| Example No. | Stage | Relectance Blank | Relectance with HBMC |
|---|---|---|---|
| | cycle 2 | | |
| | soiled | 31.8 | 34.5 |
| | washed | 54.0 | 66.0 |
| | cycle 3 | | |
| | soiled | 24.3 | 35.2 |
| | washed | 42.3 | 60.6 |
| 13 | cycle 1 | | |
| | clean fabric | 81 | 81 |
| | soiled | 51.0 | 51.3 |
| | washed | 73.1 | 73.4 |
| | cycle 2 | | |
| | soiled | 35.5 | 39.0 |
| | washed | 61.7 | 67.4 |
| | cycle 3 | | |
| | soiled | 29.0 | 38.6 |
| | washed | 51.9 | 67.4 |
| 14 | cycle 1 | | |
| | clean fabric | 81 | 81 |
| | soiled | 50.3 | 49.2 |
| | washed | 72.9 | 73.2 |
| | cycle 2 | | |
| | soiled | 33.4 | 39.0 |
| | washed | 60.5 | 69.4 |
| | cycle 3 | | |
| | soiled | 26.1 | 39.1 |
| | washed | 47.7 | 66.7 |

It is seen from the above figures that the values from each cycle were reasonably reproducible. The results also show consistently that the swatches washed with the cellulosic polymer are more resistant to soiling. Particularly, in each third cycle, these test swatches pick up less soil when deliberately soiled and are washed cleaner to the point where the reflectance of the washed swatches seem to be approaching a constant level as compared to the steadily deteriorating values for the blank swatches.

EXAMPLES 15–18

The following examples illustrate similar detergent formulations within the scope of the present invention. The procedure used to obtain the data was a one soil cycle technique where the clean fabric including swatches for antiredeposition (Dacron type 56 doubleknit polyester) was washed in the experimental washing formulation, rinsed and dried prior to the first contact with the normal soiling procedure. After soiling the detergency swatches were washed as usual along with the antiredeposition swatches. The reflectance data reported is after the completion of this first cycle.

The detergent formulation used was as follows:

| | |
|---|---|
| Surfactant | 20% (0.04% in solution) |
| $NaHCO_3 . Na_2CO_3$ | 60% (0.053% & 0.067% in solution) |
| Na Silicate (2.4/1) | 10% (0.02% in solution) |
| Sodium Sulfate | 10% (0.02% in solution) |

When hydroxybutyl methylcellulose was included in the formulation, it was at the 1 percent level (0.002 percent in solution) and the $Na_2SO_4$ was reduced to 9 percent (0.018 percent in solution). Two grams per liter of the detergent formulation was used in the 150 ppm synthetic hard water washing solution.

TABLE IV

| Ex. | Surfactant | HBMC[5] | Reflectance Soiled | Reflectance Detergency | Reflectance Antiredeposition |
|---|---|---|---|---|---|
| 15 | IGEPAL ® CO-710[1] | none | 46.3 | 77.3 | 86.8 |
| | IGEPAL ® CO-710[1] | 1% | 62.3 | 85.2 | 87.8 |
| 16 | STEPAN ® LDA[2] | none | 49.0 | 79.7 | 85.0 |
| | STEPAN ® LDA[2] | 1% | 61.8 | 84.3 | 86.6 |
| 17 | ETHOMID ® HT-25[3] | none | 55.5 | 65.9 | 85.7 |
| | ETHOMID ® HT-25[3] | 1% | 59.8 | 83.0 | 87.8 |
| 18 | PLURONIC ® L64[4] | none | 46.6 | 69.3 | 83.5 |
| | PLURONIC ® L64[4] | 1% | 59.9 | 81.5 | 87.5 |
| | AATCC Phosphate | none | 42.3 | 80.6 | 85.5 |
| | AATCC Phosphate | none | 43.0 | 79.5 | 85.5 |

[1]Nonylphenoxy poly(ethylenoxy)ethanol (General Aniline and Film Corp.)
[2]Lauric amide-ethylene oxide condensate (Stepan Chemical Co.)
[3]Ethoxylated Hydrogenated Tallow Amide (Armour Industrial Chem. Co.)
[4]Ethylene oxide condensate with a hydrophobic base formed by condensing propylene oxide with propylene glycol. A block copolymer.
[5]Hydroxybutyl methylcellulose, DS = 2.04, MS = 0.013, 2% viscosity = 90 CPS.

EXAMPLES 19–22

Swatches of Dacron ® Type 56 polyester doubleknit fabric were washed according to the three-cycle procedure of Examples 1–10 using various concentrations of a hydroxybutylmethylcellulose (DS=2.00, MS=0.05, 2 percent viscosity=100 cps) in a carbonate-nonionic surfactant formulation. A quantity of 2 grams of formulation was dissolved in a liter of 150 ppm hardness water in each case. The formulation had the following composition:

20% (by weight) nonionic surfactant (Tergitol ® 15-S-9)
60% $NaHCO_3.Na_2CO_3$
10% Na silicate ($SiO_2/Na_2O$=2.4/1)
0–1% hydroxybutylmethylcellulose
10–9% $Na_2SO_4$ The reflectance values listed in Table V are those observed after the third wash cycle.

TABLE V

| Example No. | HBMC wt. % | Reflectance Antiredeposition | Reflectance Detergency |
|---|---|---|---|
| blank | 0 | 81.6 | 53.2 |
| 19 | 0.1 | 85.4 | 56.7 |
| 20 | 0.3 | 86.2 | 64.5 |
| 21 | 0.5 | 86.0 | 66.1 |
| 22 | 1.0 | 85.7 | 67.0 |

EXAMPLE 23

Swatches of Dacron ® 56 doubleknit fabric were soiled and washed in three cycles in the sodium nitrilotriacetate-containing detergent solutions described below following the procedure used in Examples 1–10 except that the standard soil slurry was prepared with 25 g of 200–270 mesh vacuum household dirt in 3 liters of water. The antisoil activity was determined by measuring the reflectance of the soiled [switches] *swatches* prior to washing in the third cycle.

Detergent solutions were made up in 150 ppm hardness water with the following composition:

0.04% surfactant, anionic or nonionic[1]
0.05% Na nitrilotriacetate
0.02% Na silicate ($SiO_2/Na_2O$=2.4/1)
0.088% $Na_2SO_4$
0.002% cellulose derivative[2]

[1]anionic = Na linear dodecylbenzenesulfonate; nonionic = Tergitol 15-S-9.

[2]cellulose derivatives were: CMC—sodium carboxymethylcellulose; HBMC—hydroxybutyl methylcellulose; DS 2.08 $CH_3O$, MS 0.07 hydroxybutyl.

Reflectance readings after three cycles for the antiredeposition and antisoiling tests are given in Table VI.

TABLE VI

| Test No. | Surfactant | Cellulose Derivative | Reflectance Antire-deposition | Anti-soil | Deter-gency |
|---|---|---|---|---|---|
| 1 | anionic | none | 80.7 | 29.5 | 60.6 |
| 2 | anionic | CMC | 80.2 | 30.2 | 61.3 |
| 3 | anionic | HBMC | 83.5 | 30.7 | 64.6 |
| 4 | nonionic | none | 82.0 | 30.3 | 59.2 |
| 5 | nonionic | CMC | 82.5 | 30.0 | 61.7 |
| 6 | nonionic | HBMC | 85.7 | 39.7 | 65.0 |

The formulations containing HBMC were superior to the controls in antiredeposition with either anionic or nonionic detergents and to a lesser degree were superior in detergency.

EXAMPLE 24

A series of tests with Dacron® 56 doubleknit fabric swatches was run as in the foregoing examples using Tergitol® 15-S-9 solutions with the above compositions but containing hydroxybutyl methylcellulose of different DS and MS values to demonstrate the effect of varying the substitution in this component of a nonionic surfactant-nitrilotriacetate based solution. A blank with no cellulose ether component was tested in the same way for comparison.

TABLE VII

| Test No. | HBMC DS ($CH_3O$) | HBMC MS (BuOH) | Reflectance Antiredep. | Deter-gency | Anti-soil |
|---|---|---|---|---|---|
| 1 | blank | | 82.3 | 58.0 | 30.0 |
| 2 | 1.53 | 0.1 | 86.4 | 64.0 | 33.5 |
| 3 | 1.89 | 0.035 | 85.9 | 62.8 | 35.3 |
| 4 | 2.08 | 0.07 | 85.6 | 69.7 | 39.5 |

The overall advantage of the hydroxybutyl methylcellulose having both a high methoxyl content and a substantial content of hydroxybutoxy groups is evident as well as the clear superiority of all over the blank.

EXAMPLE 25

Two swatches of new Dacron® Type 56 doubleknit polyester were prewashed in each of the following phosphate-containing detergent solutions, rinsed, dried, and then subjected to the one soil cycle technique as described in Examples 15–18. Reflectances were measured after that one soiling cycle to measure the antisoil effect obtained.

Phosphate Blank

20% Tergitol® 15-S-9
35% Na tripolyphosphate
45% $Na_2SO_4$

Antisoil Phosphate Composition

20% Tergitol® 15-S-9
35% Na tripolyphosphate
44% $Na_2SO_4$
1% hydroxybutyl methylcellulose (2.08 DS $CH_3O$, 0.07 MS hydroxybutyl 74 cps, viscosity in 2% solution)

Two-gram portions of each of the above compositions were dissolved in one-liter portions of 150 ppm hardness water to make up the test solutions.

TABLE VIII

| Solution | Reflectance |
|---|---|
| Phosphate blank | 39.0 |
| Antisoil phosphate composition | 52.8 |

EXAMPLE 26

Swatches of two types of polyester and nylon were prewashed in detergent solutions listed below before soiling with dirty motor oil and washing to determine relative antisoiling effects according to the following procedure.

(1) One swatch each of Dacron® 56 polyester doubleknit, spun Dacron® 54, and nylon 66 were prewashed for 10 minutes at 48° C.
(2) The washed swatches were squeezed to remove excess solution and then rinsed in 250 ml deionized water for two minutes.
(3) The rinsed swatches were squeezed and dried at about 55° C. in a tumble drier.
(4) The dry swatches were each soiled with 3 drops of dirty motor oil and allowed to stand for 2 hours.
(5) [Reflectancee] *Reflectances* of the soiled swatches were measured with a Reflectometer.
(6) The combined swatches were washed in one liter of 0.11 percent Tide® solution for 20 minutes at 50° C., rinsed, and dried as above and reflectances were measured.

The following detergent solutions were made up in 90 ppm hardness water to contain 0.04 percent surfactant, 0.07 percent Na tripolyphosphate, 0.02 percent Na silicate ($SiO_2/Na_2O=2.4/1$), $Na_2SO_4$ as noted, and, when used, 0.002 percent antisoilant.

TABLE IX

| Test No. | Surfactant | % $Na_2SO_4$ | Antisoilant |
|---|---|---|---|
| 1 | TERGITOL® 15-S-9 | 0.07 | none |
| 2 | TERGITOL® 15-S-9 | 0.068 | CMC[a] |
| 3 | TERGITOL® 15-S-9 | 0.068 | HBMC-A[b] |
| 4 | TERGITOL® 15-S-9 | 0.068 | HBMC-B[c] |
| 5 | LAS[d] | 0.07 | none |
| 6 | LAS[d] | 0.068 | CMC[a] |
| 7 | LAS[d] | 0.068 | HBMC-A[b] |
| 8 | LAS[d] | 0.068 | HBMC-B[c] |

[a]carboxymethylcellulose, 0.7 DS sodium carboxymethyl.
[b]hydroxybutyl methylcellulose, 20.8 DS $CH_3O$, 0.07 MS hydroxybutyl, 74 cps (2 percent solution).
[c]hydroxybutyl methylcellulose, 1.53 DS $CH_3O$, 0.1 MS hydroxybutyl, 29.5 cps (2 percent solution).
[d]linear dodecylbenzene sulfonate, Na salt.

Reflectance readings are reported as Δ Reflectance = - Reflectance washed − Reflectance soiled. The results show clearly the strong antisoil effect obtained by the combination of nonionic surfactant with the hydroxybutylated methylcellulose, particularly that with the higher DS value.

TABLE X

| Antisoilant | LAS Solution Dacron® 56 | Dacron® 54 | nylon | Tergitol Solution Dacron® 56 | Dacron > 54 | nylon |
|---|---|---|---|---|---|---|
| none | −0.5 | 0 | 2.5 | −0.6 | −0.4 | 1.8 |

TABLE X-continued

| | LAS Solution | | | Tergitol Solution | | |
|---|---|---|---|---|---|---|
| Antisoilant | Dacron ® 56 | Dacron ® 54 | nylon | Dacron ® 56 | Dacron > 54 | nylon |
| CMC | −0.6 | 1.0 | 4.2 | −0.1 | 0 | 3.4 |
| HBMC-A | 2.2 | 1.9 | 5.8 | 16.5 | 24.6 | 11.4 |
| HBMC-B | 2.3 | 1.0 | 6.8 | 2.9 | 5.5 | 7.8 |

We claim:

1. A detergent composition wherein the essential components thereof consist of
   (a) about 20 percent by weight of a $C_8$–$C_{22}$ alkyl monoether of a polyethylene glycol of about 5–20 alkylene oxide units,
   (b) about 60 percent of sodium sesquicarbonate,
   (c) about 10 percent of sodium silicate having a ratio of $SiO_2/Na_2O$ of about 2–3/1,
   (d) about 0.1–2 percent of a hydroxybutylmethylcellulose having a DS of about 1.5–2.3 and an MS of about 0.01–0.6, *and a viscosity of about 20–200 cps. in 2 percent aqueous solution at 20° C.* and
   (e) about 10 percent of $Na_2SO_4$.

2. A detergent composition wherein the composition consists essentially of
   (a) about 20 percent by weight of an ethylene oxidepolypropylene glycol block copolymer,
   (b) about 60 percent of sodium sesquicarbonate,
   (c) about 10 percent of sodium silicate having a ratio of $SiO_2/Na_2O$ of about 2–3/1,
   (d) about 0.1–2 percent of a hydroxybutylmethylcellulose having a DS of about 1.5–2.3 and an MS of about 0.01–0.6, *and a viscosity of about 20–200 cps. in 2 percent aqueous solution at 20° C.* and
   (e) about 10 percent of $Na_2SO_4$.

3. A detergent composition which consists essentially of
   (a) about 20 percent by weight of a $C_8$–$C_{22}$ alkyl monoether of a polyethylene glycol of about 5–20 alkylene oxide units,
   (b) about 35 percent of sodium tripolyphosphate,
   (c) about 1 percent of a hydroxybutylmethylcellulose having a DS of about 1.5–2.3 and an MS of about 0.01–0.6, *and a viscosity of about 20–200 cps. in 2 percent aqueous solution at 20° C.* and
   (d) about 44 percent of $Na_2SO_4$.

4. A detergent composition which consists essentially of
   (a) about 20 percent by weight of a $C_8$–$C_{22}$ alkyl monoether of a polyethylene glycol of about 5–20 alkylene oxide units,
   (b) about 25 percent of sodium nitrilotriacetate,
   (c) about 10 percent of sodium silicate having a ratio of $SiO_2/Na_2O$ of about 2–3/1,
   (d) about 1 percent of a hydroxybutylmethylcellulose having a DS of about 1.5–2.3 and an MS of about 0.01–0.6, *and a viscosity of about 20–200 cps. in 2 percent aqueous solution at 20° C.* and
   (e) about 44 percent of $Na_2SO_4$.

* * * * *

UNITED STATES PATENT AND TRADEMARK OFFICE

CERTIFICATE OF CORRECTION

PATENT NO. : Re. 30,472

DATED : January 6, 1981

INVENTOR(S) : Arthur S. Teot; Percy J. Hamlin and Albert B. Savage

It is certified that error appears in the above—identified patent and that said Letters Patent is hereby corrected as shown below:

Col. 5, line 54, "$SiO/Na_2O$" should read -- $SiO_2/Na_2O$ --.

Col. 6, line 63, in the heading of Table III, "Relectance" should read -- Reflectance --.

Col. 7, line 2, in the heading of Table III, "Relectance" should read -- Reflectance --.

Col. 10, line 53, in footnote b, "20.8 DS" should be -- 2.08 DS --.

Col. 10, line 66, in the heading of Table X, "Dacron> 54" should be -- Dacron ® 54 --.

Signed and Sealed this

First Day of September 1981

[SEAL]

Attest:

GERALD J. MOSSINGHOFF

Attesting Officer

Commissioner of Patents and Trademarks